(12) United States Patent
Jeon

(10) Patent No.: US 10,671,992 B2
(45) Date of Patent: Jun. 2, 2020

(54) TERMINAL AND CONTROLLING METHOD THEREOF

(71) Applicant: LG Electronics Inc., Seoul (KR)

(72) Inventor: Jaebeom Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 954 days.

(21) Appl. No.: 15/086,653

(22) Filed: Mar. 31, 2016

(65) Prior Publication Data

US 2017/0124549 A1  May 4, 2017

(30) Foreign Application Priority Data

Nov. 4, 2015 (KR) .................. 10-2015-0154356

(51) Int. Cl.
  *G06Q 40/00* (2012.01)
  *G06Q 20/32* (2012.01)
  *G06F 3/0482* (2013.01)
  *G06F 3/16* (2006.01)
  *G06Q 20/36* (2012.01)
  *H04M 1/725* (2006.01)

(52) U.S. Cl.
  CPC ......... *G06Q 20/322* (2013.01); *G06F 3/0482* (2013.01); *G06F 3/167* (2013.01); *G06Q 20/367* (2013.01); *H04M 1/72583* (2013.01); *H04M 1/72522* (2013.01)

(58) Field of Classification Search
  None
  See application file for complete search history.

(56) References Cited

U.S. PATENT DOCUMENTS

| 2012/0310760 A1 | 12/2012 | Phillips et al. |
| 2014/0093101 A1 | 4/2014 | Lee et al. |
| 2014/0201069 A1 | 7/2014 | Arentz |
| 2014/0372123 A1* | 12/2014 | Go .................... G10L 13/08 704/260 |

FOREIGN PATENT DOCUMENTS

| KR | 100394150 B1 | 7/2003 |
| KR | 1020060028265 A | 3/2006 |

* cited by examiner

*Primary Examiner* — Scott S Trotter
(74) *Attorney, Agent, or Firm* — Dentons US LLP

(57) ABSTRACT

Disclosed are a terminal and controlling method thereof. The present invention includes a display unit configured to display a sound output menu for selecting whether to perform a voice output in performing a payment, a communication unit configured to transceive payment information, a controller, if the payment is performed when the sound output menu is ON state, converting the payment information into a voice, and an audio output module configured to output the payment information converted into the voice.

6 Claims, 11 Drawing Sheets

TERMINAL AND CONTROLLING METHOD THEREOF

Pursuant to 35 U.S.C. § 119(a), this application claims the benefit of earlier filing date and right of priority to Korean Application No. 10-2015-0154356, filed on Nov. 4, 2015, the contents of which are hereby incorporated by reference herein in their entirety.

BACKGROUND OF THE INVENTION

Field of the Invention

The present invention relates to a terminal, and more particularly, to a terminal and controlling method thereof.

Discussion of the Related Art

Generally, terminals can be classified into mobile/portable terminals and stationary terminals. In particular, the mobile terminals can be further classified into handheld terminals and vehicle mounted terminals according to possibility of user's direct portability.

Recently, functions of a terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Meanwhile, a terminal includes various functions. One of the various functions included in the terminal is a payment function. Hence, the demand for a technology for a user to easily recognize a payment function and to conveniently use the recognized payment function is increasingly rising.

SUMMARY OF THE INVENTION

Accordingly, embodiments of the present invention are directed to a terminal and controlling method thereof that substantially obviate one or more problems due to limitations and disadvantages of the related art.

An object of the present invention is to provide a terminal and controlling method thereof, by which a payment step or a payment information can be provided in a voice on executing a payment function.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal according to one embodiment of the present invention may include a display unit configured to display a sound output menu for selecting whether to perform a voice output in performing a payment, a communication unit configured to transceive payment information, a controller, if the payment is performed when the sound output menu is ON state, converting the payment information into a voice, and an audio output module configured to output the payment information converted into the voice.

Preferably, the payment information may include at least one of a card information of a card used for the payment, a payment made time, a payment amount, a payment made location, and a business type of a payment made shop.

More preferably, the controller may control the display unit to display a voice output selection menu for selecting an item to be outputted in the voice in the payment information.

And, the controller may convert an item selected from the voice output selection menu into the voice only.

More preferably, the controller may control the display unit to display a voice output information when the payment information is outputted in the voice.

And, if receiving an input of an extending command for the displayed voice output information, the controller may control the display unit to display a voice output selection menu for selecting an item to be outputted in the voice in the payment information.

More preferably, the controller may control the display unit to display a control menu related to the voice output.

And, the control menu may include a volume adjustment item for each item of the payment information.

Preferably, if a payment menu is executed, the controller may control the audio output unit to output a card information set for the payment in the voice.

In another aspect of the present invention, as embodied and broadly described herein, a method of controlling a terminal according to another embodiment of the present invention may include the steps of displaying a sound output menu for selecting whether to perform a voice output in performing a payment, transceiving payment information, if the payment is performed when the sound output menu is ON state, converting the payment information into a voice, and outputting the payment information converted into the voice.

Preferably, the payment information may include at least one of a card information of a card used for the payment, a payment made time, a payment amount, a payment made location, and a business type of a payment made shop.

More preferably, the method may further include the step of displaying a voice output selection menu for selecting an item to be outputted in the voice in the payment information.

And, the converting step may include the step of converting an item selected from the voice output selection menu into the voice only.

More preferably, the outputting step may include the step of displaying a voice output information when the payment information is outputted in the voice.

And, the method may further include the step of if receiving an input of an extending command for the displayed voice output information, displaying a voice output selection menu for selecting an item to be outputted in the voice in the payment information.

More preferably, the method may further include the step of displaying a control menu related to the voice output.

And, the control menu may include a volume adjustment item for each item of the payment information.

Preferably, the method may further include the step of if a payment menu is executed, outputting a card information set for the payment in the voice.

Accordingly, embodiments of the present invention provide various effects and/or features.

According to at least one of embodiments of the present invention, a payment card information or a payment breakdown information is indicated in a voice.

According to at least one of embodiments of the present invention, an item to be outputted in a voice can be selected or deleted.

According to at least one of embodiments of the present invention, a setting value related to a voice output can be controlled.

Effects obtainable from the present invention may be non-limited by the above mentioned effects. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
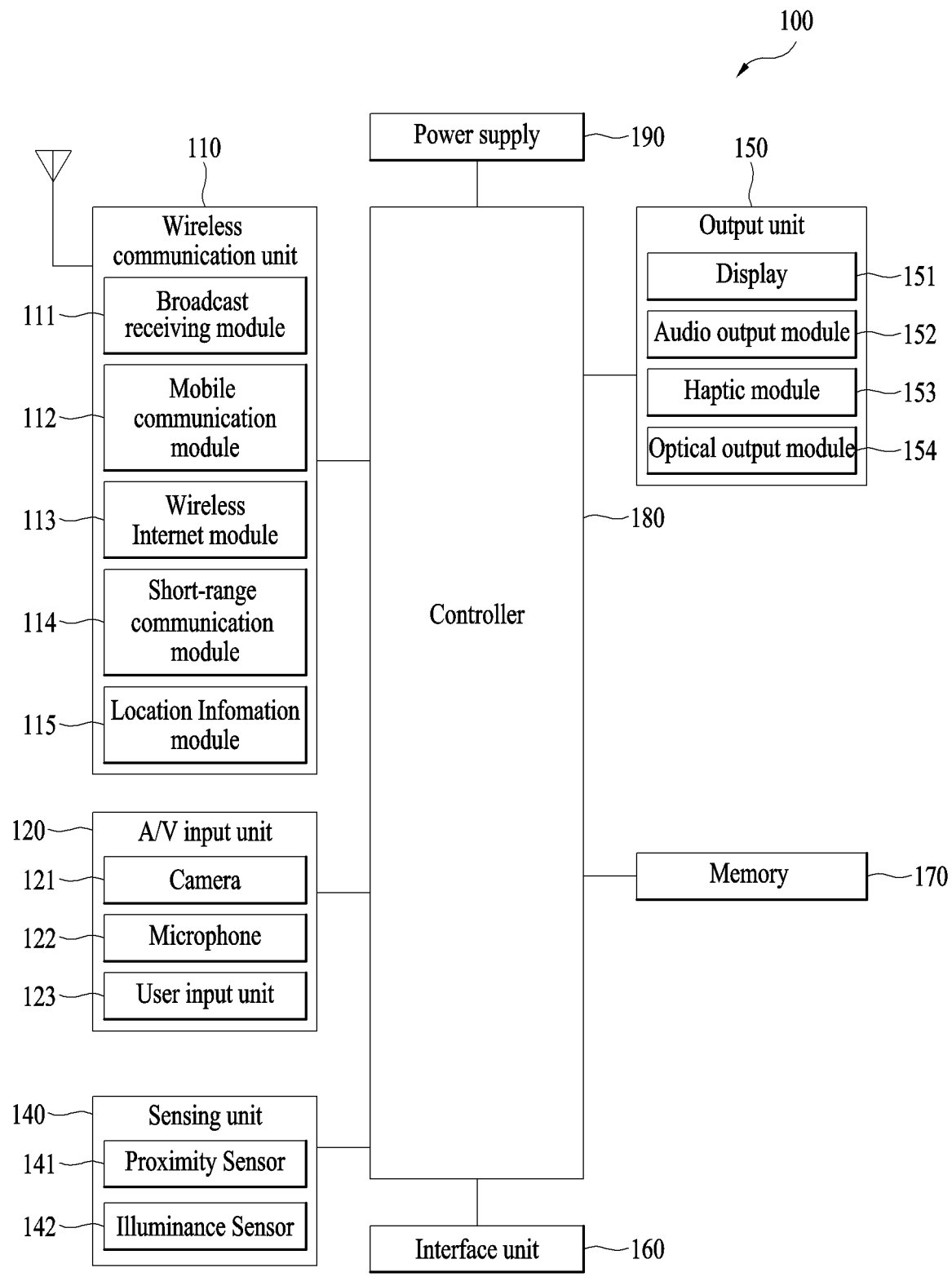
FIG. 1A is a block diagram of a mobile terminal in accordance with the present disclosure.
Figure 1B:
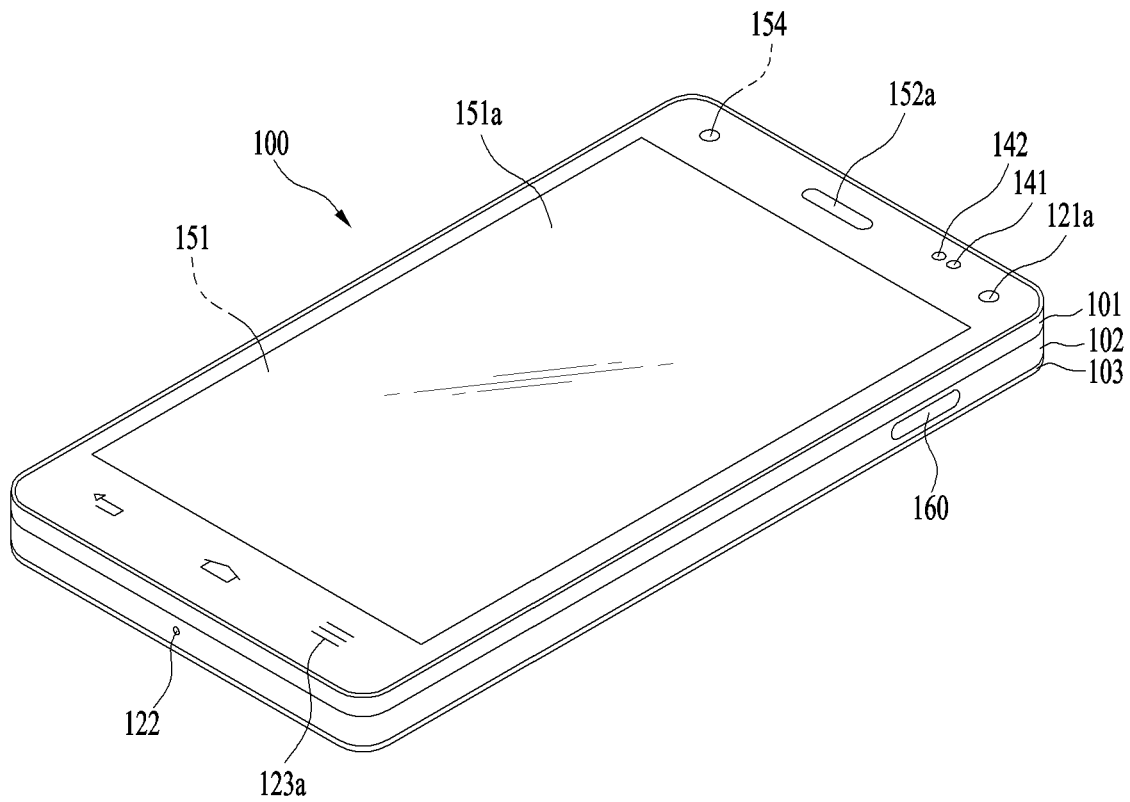
FIGS. 1B and 1C are conceptual views of one example of the mobile terminal, viewed from different directions.
Figure 1C:
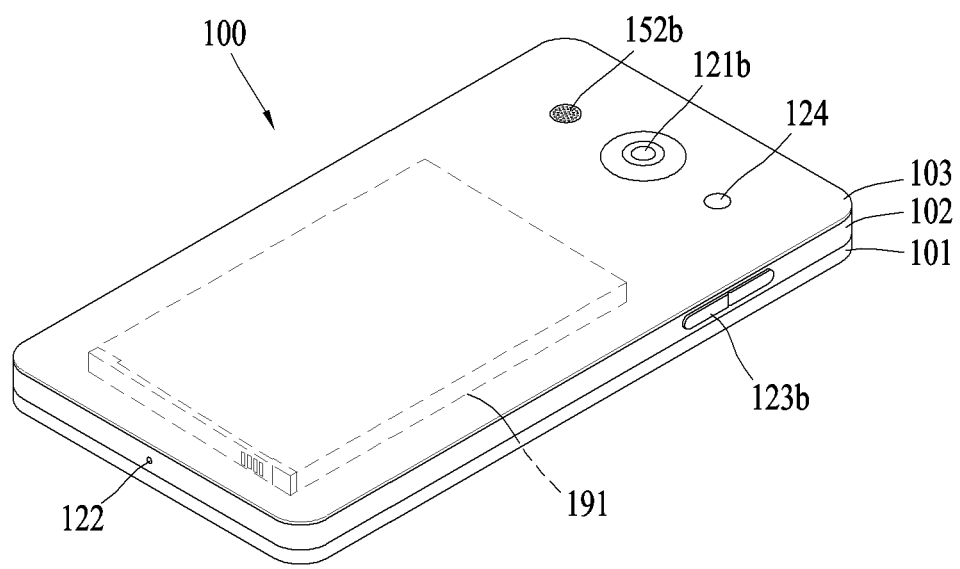

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following description, controlling methods, which can be implemented in the above-configured terminal, according to embodiments of the present invention are explained with reference to the accompanying drawings. It will be appreciated by those skilled in the art that various modifications and variations can be made in the present invention without departing from the spirit or scope of the inventions.

Figure 2:
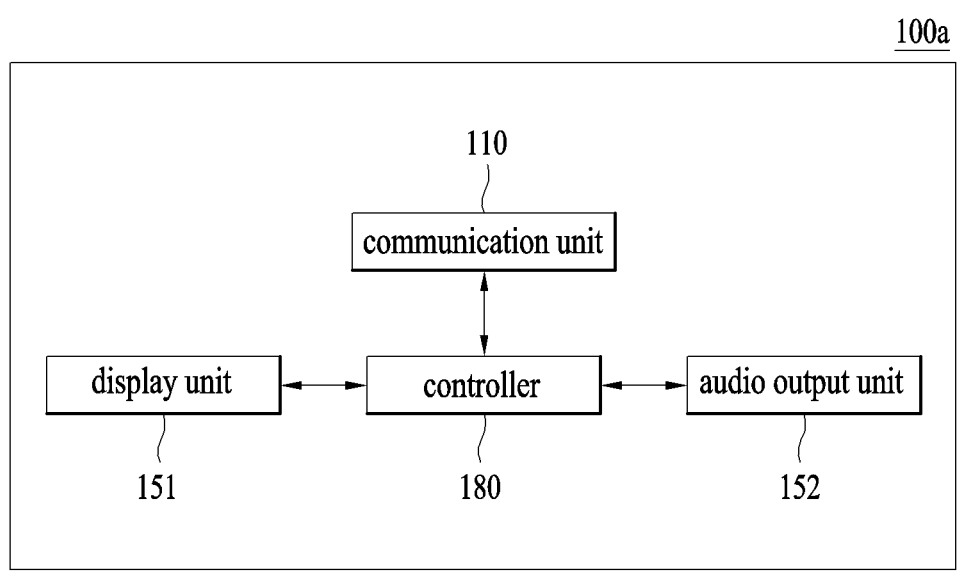
FIG. 2 is a block diagram of a terminal according to one embodiment of the present invention.

FIG. 2 is a block diagram of a terminal according to one embodiment of the present invention.

Referring to FIG. 2, a terminal 100a may include a communication unit 110, a display unit 151, an audio output unit 152 and a controller 180.

The communication unit 110 can transceive payment information. The communication unit 110 can send information for payment to a payment terminal (e.g., POS terminal, etc.). The information for payment may include a card information, a user information and the like. Once a payment is made, the communication unit 110 can receive a payment breakdown information from the payment terminal or a server. The payment breakdown information may include such information as a card information of a card used for the payment, a payment made location, a payment made time, a payment amount, a business type of a payment made shop, and the like.

The display unit 151 may display a sound output menu for selecting whether to output a voice when a payment is made. If a payment mode is entered, the display unit 151 can display a card for the payment. And, the display unit 151 may output a sound output menu. In this case, the sound output menu may include a menu for selecting whether to output payment information in a voice. The payment information may include an information for a payment and a payment breakdown information. For instance, if the sound output menu is set to 'ON', the terminal 100a can output the payment information in a voice. If the sound output menu is set to 'OFF', the terminal 100a may not output the payment information in a voice. In doing so, when the payment is made, the terminal 100a may output vibration or may output a visual element to the display unit 151. The sound output menu may be controlled by a touch input. If the sound output menu is touched once, it can be switched to ON. If the sound output menu is touched again, it can be switched to OFF. If the sound output menu is touched once again, the can be switched to ON. In particular, the sound output menu can be toggled between ON and OFF.

When the sound output menu is in ON state, if a payment is made, the audio output unit 152 can output a payment information in a voice. When the sound output menu is in ON state, the audio output unit 152 can output a voice. Meanwhile, when the sound output menu is in OFF state, the audio output unit 152 may output a melody. According to one embodiment, the audio output unit 152 may output a different melody in accordance with a car. For instance, if a card is Card-A, the audio output unit 152 can output Melody-a. For another instance, if a card is Card-B, the audio output unit 152 can output Melody-b. Alternatively, the audio output unit 152 may output a different melody in accordance with a step. For instance, the audio output unit 152 can output Melody-a in a payment standby step. For another instance, the audio output unit 152 can output Melody-b in a payment progressive step. For further instance, the audio output unit 152 can output Melody-c in a payment complete step.

When the sound output menu is in ON state, if a payment is made, the controller 180 can convert a payment information into a voice. In particular, the controller 180 determines an output that should be outputted in a voice. The controller 180 is then able to analyze the payment information. The controller 180 can determine the item, which should be outputted in a voice, from the analyzed payment information. The controller 180 can convert the item determined from the payment information into a voice. The controller 180 can control the audio output unit 152 to output the converted item in a voice. The controller 180 can select a presence or non-presence of a audio output and a payment information item, which should be outputted in a voice, in accordance with a user's selection.

Figure 3:
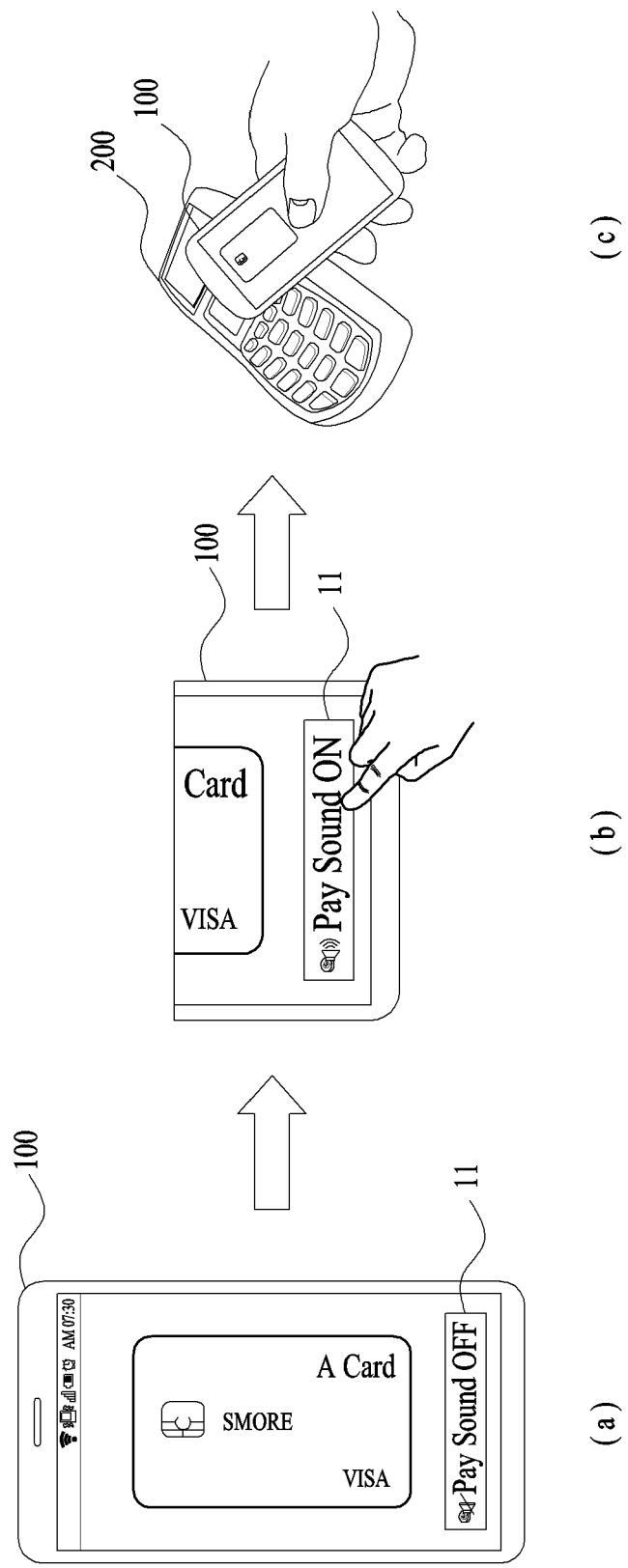
FIG. 3 is a diagram to describe a process for making a payment according to one embodiment of the present invention.

FIG. 3 is a diagram to describe a process for making a payment according to one embodiment of the present invention.

Referring to FIG. 3 (a), a terminal 100 having executed a payment mode is illustrated. The terminal 100 can execute the payment mode in accordance with user's control. The terminal 100 can display a card for a payment. And, the terminal 100 can display a sound output menu 11. In particular, the sound output menu 11 may include a menu for determining whether to output a payment item in a voice. For instance, if the sound output menu 11 is set to ON, the terminal 100 can output the payment item in a voice. If the sound output menu 11 is set to OFF, the terminal 100 may not output the payment item in a voice. In doing so, the terminal 100 can output a vibration of a different pattern in accordance with a payment step or a card type. Alternatively, the terminal 100 may output a sound (or melody) of a different pattern in accordance with a payment step or a card type.

Referring to FIG. 3 (b), the terminal 100 configured to toggle the sound output menu 11 is illustrated. The sound output menu 11 can be toggled between ON and OFF in response to a user's input. In particular, when the sound output menu 11 is set to OFF, if a selection command is inputted once, the sound output menu 11 can be switched to ON. If a selection command is inputted once again, the sound output menu 11 can be switched to OFF.

Referring to FIG. 3 (c), a terminal 100 configured to enable a payment to be in progress is illustrated. If the terminal 100 approaches a payment terminal 200 (e.g., a POS terminal, etc.), the terminal 100 enables a payment to be in progress. When the sound output menu 11 is set to ON, if the payment proceeds, the terminal 100 can output an item, which is selected from payment information, in a voice.

Figure 4:
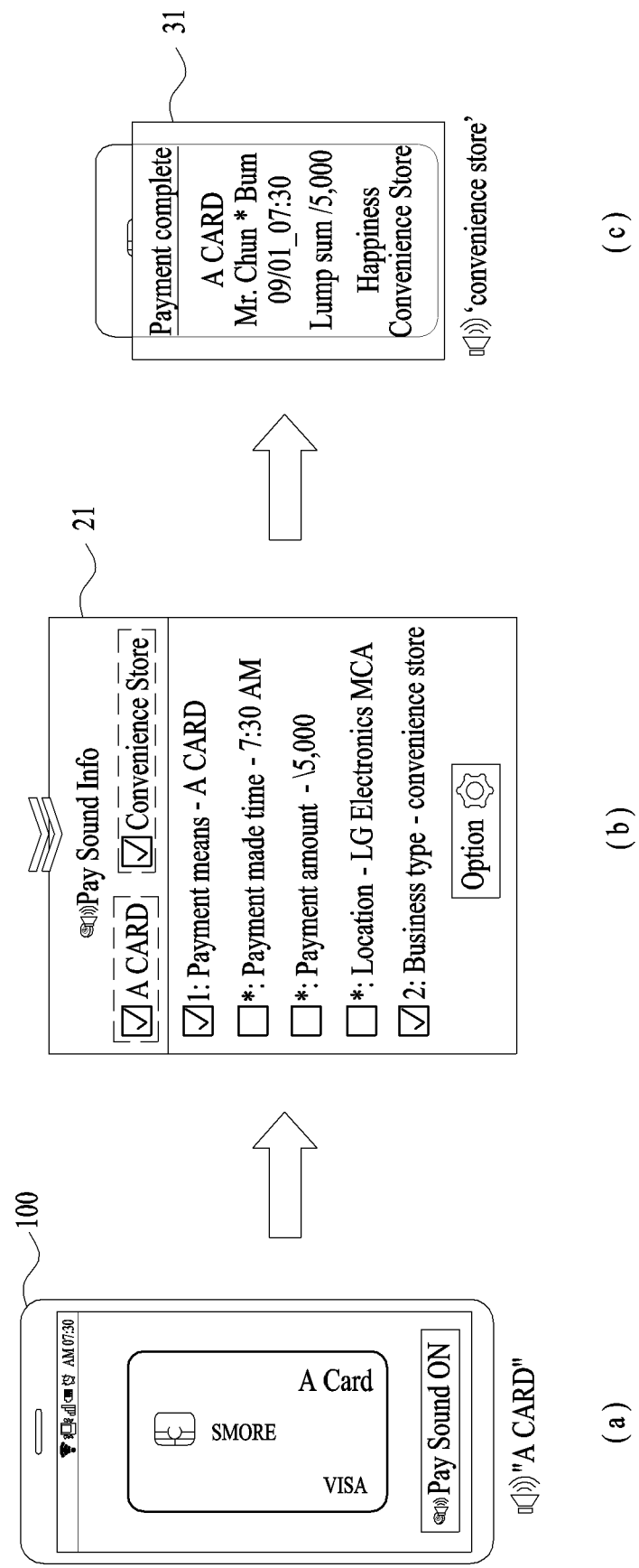
FIG. 4 is a diagram to describe one example of outputting a payment information in a voice according to one embodiment of the present invention.

FIG. 4 is a diagram to describe one example of outputting a payment information in a voice according to one embodiment of the present invention.

Referring to FIG. 4 (a), a terminal 100 outputting a payment means in a voice is shown. An item, which is to be outputted in a voice, in payment information can be determined in a user's selection. For instance, the payment information may include a card information of a card used for the payment, a payment made location, a payment made time, a payment amount, a business type of a payment made shop, and the like. According to one embodiment, basically, the terminal 100 selects several items from the payment information and is then able to output the selected items in a voice. According to one embodiment, the terminal 100 can basically select a payment means item and a business type item of a payment made shop. In particular, if the sound output menu 11 is set to ON and is also set to defaults, the terminal 100 can output a payment means item and a business type item of a payment made shop in a voice. Therefore, if the terminal 100 enters a payment mode, the terminal 100 can output Card-A set to default in a voice.

Referring to FIG. 4 (b), a voice output selection menu 21 is shown. The voice output selection menu 21 is the menu for selecting an item to be outputted in a voice in payment information. The voice output selection menu 21 can be displayed by extending the sound output menu. Alternatively, the voice output selection menu 21 can be displayed by being searched for and then selected. The voice output selection menu 21 can include a region for displaying a selected item as a current voice output item and a region for selecting or releasing a voice output. The terminal 100 shown in FIG. 4 is set to default values and a payment means item and a business type of a payment made shop are selected.

Referring to FIG. 4 (c), the terminal 100 outputting a business type of a payment made shop in a voice is illustrated. As mentioned in the foregoing description, the terminal 100 shown in FIG. 4 is selected to output the payment means item and the business type item of the payment made shot in a voice. Hence, as shown in FIG. 4 (a), if the payment mode is entered, the terminal 100 can output the set card item in a voice. If the payment is completed, the terminal 100 can output the business type of the payment made shot in a voice. Meanwhile, the terminal 100 can display a payment breakdown information 31 separately from the voice output.

According to the embodiment described with reference to FIG. 4, an item to be outputted in a voice is set to a default. According to one embodiment, the default items to be outputted in a voice may include a payment means item and a business type item of a payment made shop. Yet, the items described with reference to FIG. 4 are just one example and various items can be set to the default items for a voice output.

Figure 5:
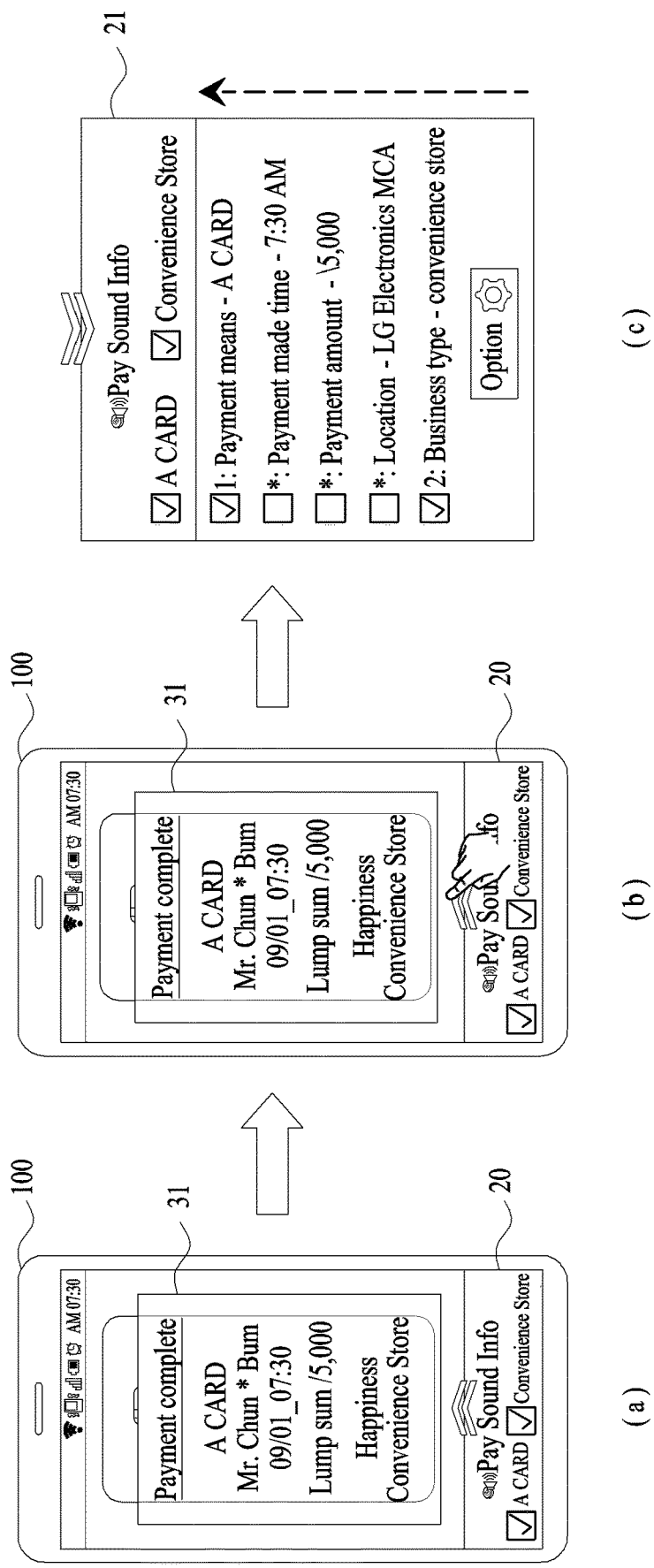
FIG. 5 is a diagram to describe a voice output selection menu according to one embodiment of the present invention.

FIG. 5 is a diagram to describe a voice output selection menu according to one embodiment of the present invention.

Referring to FIG. 5 (a), a terminal 100 performing a payment procedure is illustrated. If a payment is completed, the terminal 100 may display a payment breakdown information 31. And, the terminal 100 may output a voice output information 20. The payment breakdown information 31 may include information on a payment breakdown. For instance, the payment breakdown information 31 may include information on a payment card, a payment made time, a payment amount, a payment made location and the like. And, the voice output information 20 may include information on an item to be outputted in a voice. The terminal 100 shown in FIG. 5 is set to output a payment card item and a business type item of a payment made shot in a voice.

Referring to FIG. 5 (b), the terminal 100 extending the voice output information 20 is illustrated. The voice output information 20 may be extended in response to a user's command. According to one embodiment, if a swipe gesture is inputted to an edge point of the voice output information 20, the terminal 100 can extend the voice output information 20. In this case, the swipe gesture may mean a gesture applied in a manner of touching one point and then moving to another point by maintaining the touch. For instance, the swipe gesture may include one of a flicking gesture, a drag gesture and the like. In response to the input of the swipe gesture, the terminal 100 can extend the voice output information 20. The terminal 100 can extend the voice output information 20 in a manner of making the payment breakdown information 31 disappear through the other side of a screen. Alternatively, the terminal 100 may control the voice output information 20 to be extended in a manner of overlaying the payment breakdown information 31.

Referring to FIG. 5 (c), a voice output selection menu 21 is shown. If the voice output information 20 is extended, the voice output selection menu 21 can be displayed. In this case, the voice output selection menu 21 may mean a menu for selecting an item to be outputted in a voice. The terminal 100 may set to default values initially. According to one example, a payment means item and an item of a business type of a payment made shot can be selected only. Yet, a user may select another item from the voice output selection menu 21 or release a selection of the payment mean item or the business type item of the payment made shop.

Figure 6:
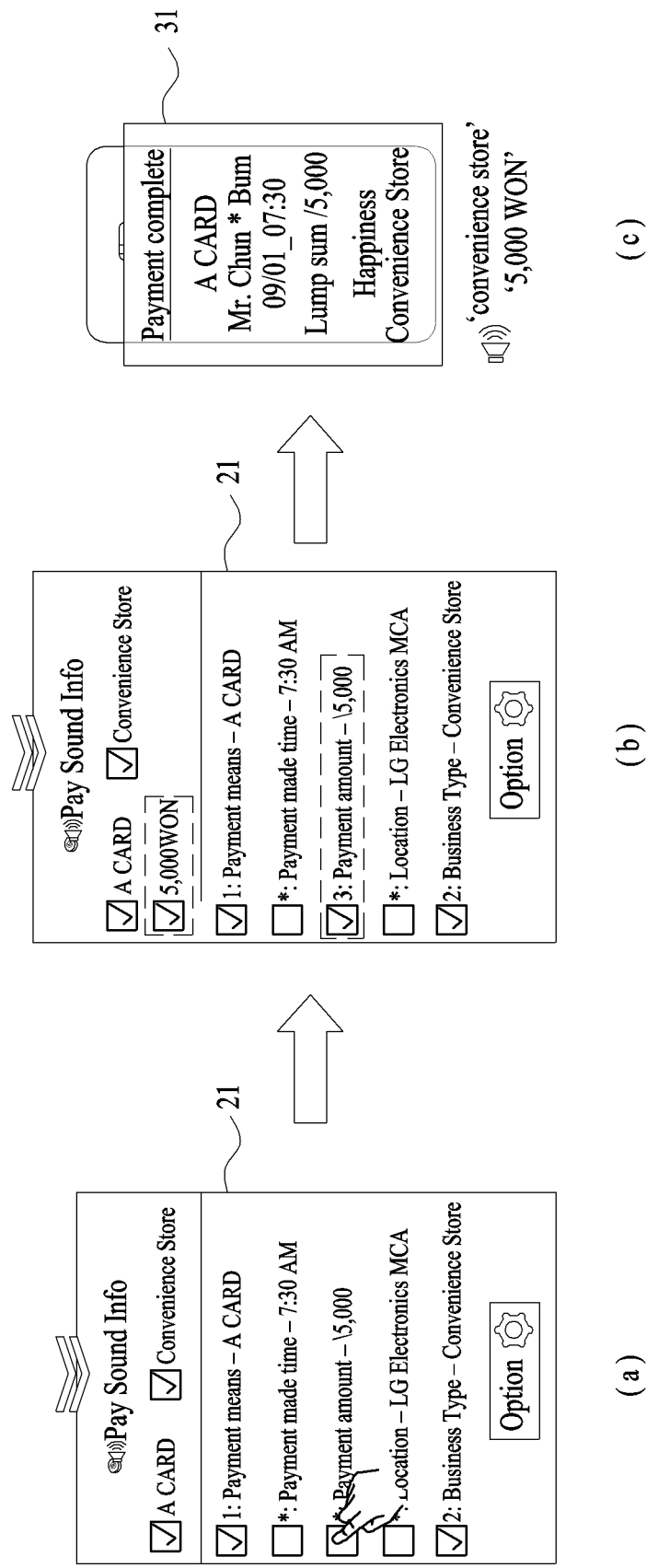
FIG. 6 is a diagram to describe a process for selecting a voice output item according to one embodiment of the present invention.

FIG. 6 is a diagram to describe a process for selecting a voice output item according to one embodiment of the present invention.

Referring to FIG. 6 (a), a voice output selection menu 21 is shown. A user can select another item. The user may select a payment amount item, as shown in FIG. 6 (a).

Referring to FIG. 6 (b), the voice output selection menu 21 from which a payment amount item is selected is illustrated. The terminal 100 can display a selection mark on the payment amount item in response to a user's input. And, the terminal 100 can add the payment amount item to a region for display items selected from the voice output selection menu 21. In particular, the terminal 100 can display a payment card item, a business type item of a payment made shop, and a payment amount item on the region for displaying the selected items.

Referring to FIG. 6 (c), the terminal 100 outputting payment information in a voice is illustrated. If a payment is in progress, the terminal 100 can display a payment breakdown information 31. Unlike the item outputted in the voice, the payment breakdown information may include all items of the payment breakdown. Yet, the terminal 100 can output the selected item in the voice only. In particular, the terminal 100 can output the payment amount item and the business type item of the payment made shop in the voice only. Meanwhile, a user can release some items from the selected items to be outputted in the voice.

Figure 7:
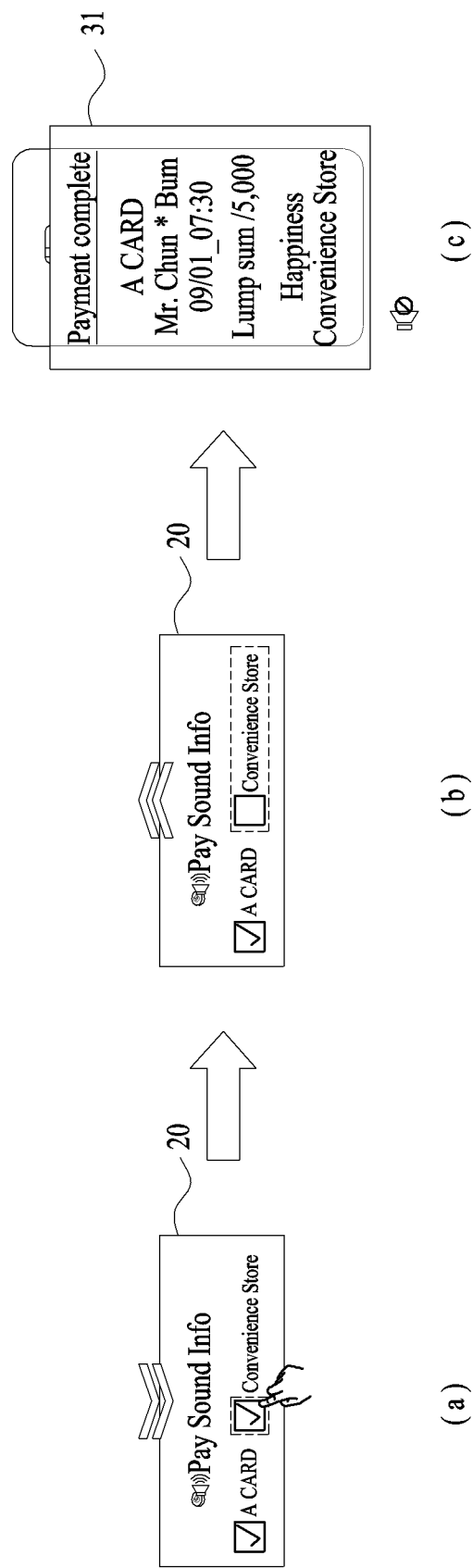
FIG. 7 is a diagram to describe a process for deleting a voice output item according to one embodiment of the present invention.

FIG. 7 is a diagram to describe a process for deleting a voice output item according to one embodiment of the present invention.

Referring to FIG. 7 (a), a voice output information 20 is shown. The terminal 100 can display the voice output information 20. In this case, the voice output information 20 may include items to be outputted in a voice. According to one embodiment, as shown in FIG. 7 (a), a payment card item and a business type item of a payment made shop are selected. A user can release a selection mark of one of the displayed items or selection marks of all of the displayed items.

Referring to FIG. 7 (b), the audio output information 20 including the selection released item is shown. The terminal 100 can release the selection mark of one item or the selection marks of all items in response to a user's selection. According to one embodiment, as shown in FIG. 7 (b), the business type item of the payment made shop can be released in response to a user's selection.

Referring to FIG. 7 (c), the terminal 100 outputting a voice in consideration of a selection release from a prescribed item is shown. If a payment is in progress, the terminal 100 can display a payment breakdown information 31. And, the terminal 100 can output the selected item in the payment breakdown information in a voice. In response to a user's selection, the terminal 100 releases the business type item of the payment made shop. Hence, since the payment card item is selected only, the terminal 100 can output the payment card item in the voice only. When the terminal 100 executes a payment mode, the terminal 100 can output information on the payment card item in the voice. Hence, referring to FIG. 7 (c), if the payment is completed, the terminal 100 may not output any information in a voice. The release of the item to be outputted in the voice can be performed in a different way.

Figure 8:
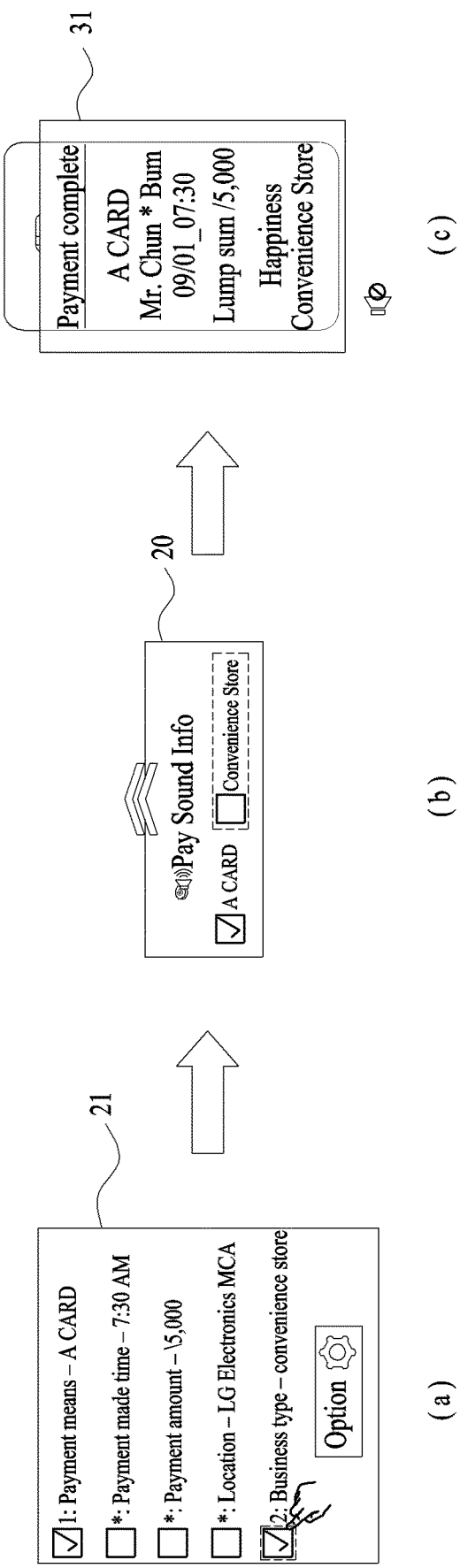
FIG. 8 is a diagram to describe a process for deleting a voice output item according to another embodiment of the present invention.

FIG. 8 is a diagram to describe a process for deleting a voice output item according to another embodiment of the present invention.

Referring to FIG. 8 (a), a voice output selection menu 21 is shown. The voice output selection menu 21 can display a selection mark for an item selected to output in a voice. A user can re-select the selected item. The terminal 100 may release the selection mark for the item, which is to be outputted in a voice, in response to a user's selection.

Referring to FIG. 8 (b), a voice output information 20 is illustrated. According to the description with reference to FIG. 8, the terminal 100 releases a selection of a business type item of a payment made shop. Hence, the voice output information 20 may display a selection mark for a payment card item only. As mentioned in the foregoing description, the terminal 100 can set the payment card item and the business type item of the payment made shop to default values. Hence, the payment card item and the business type item of the payment made shop can be always included in the voice output information 20 irrespective of a presence or non-presence of a display of a selection mark.

Referring to FIG. 8 (c), the terminal 100 outputting a voice in consideration of a selection release of a prescribed item is shown. In a manner similar to that mentioned in the foregoing description, the payment card item may be selected as a voice output item. Hence, if a payment is in progress, the terminal 100 may not perform a voice output despite displaying a payment breakdown information 31.

Figure 9:
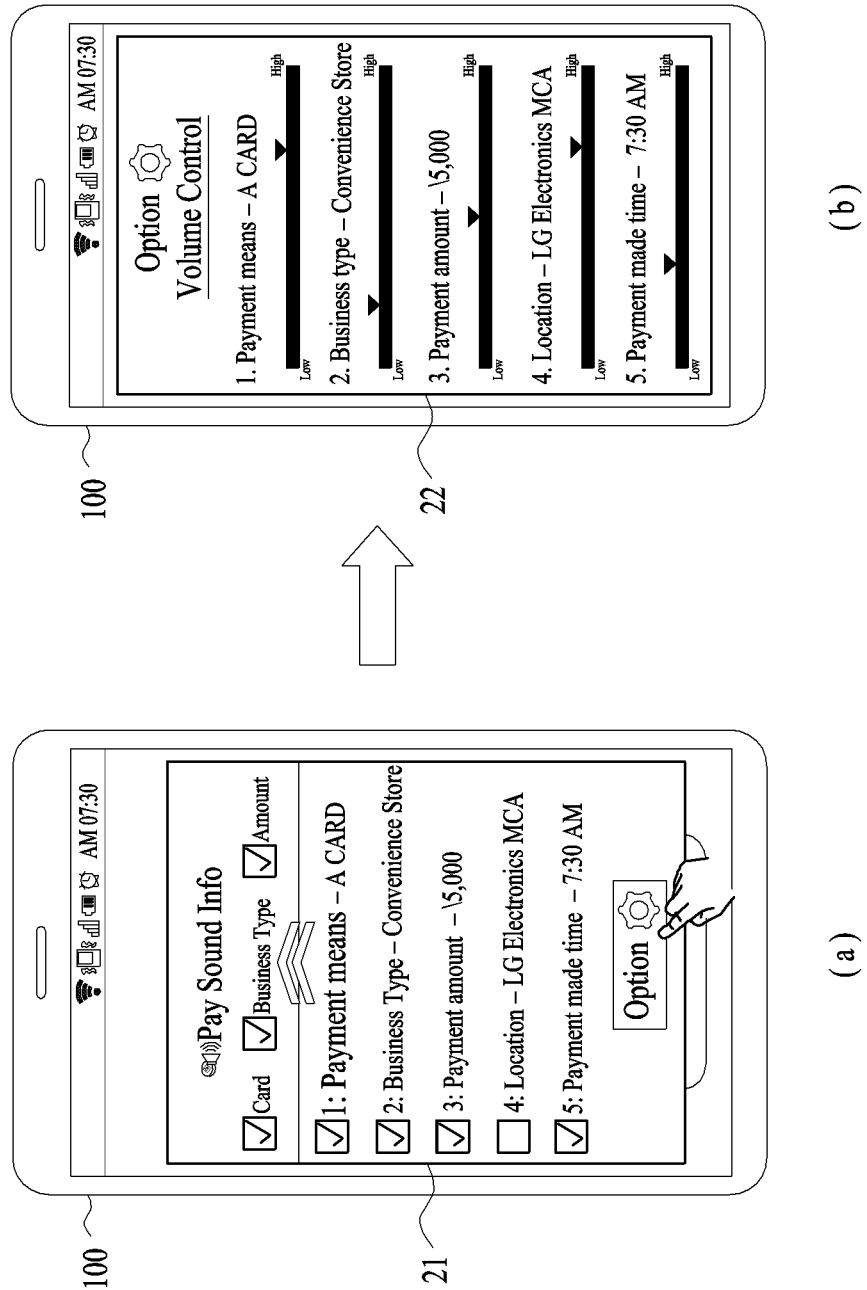
FIG. 9 is a diagram to describe a control menu related to a voice output according to one embodiment of the present invention.

FIG. 9 is a diagram to describe a control menu related to a voice output according to one embodiment of the present invention.

Referring to FIG. 9 (a), a terminal 100 displaying a voice output selection menu 21 is shown. The terminal 100 can include a menu for controlling a voice output. For instance, the voice output selection menu 21 can include an option item. If the option item is selected, the terminal 100 can display a menu for controlling the voice output.

Referring to FIG. 9 (b), the terminal 100 displaying a control menu 22 is shown. According to one embodiment, the control menu 22 may include a volume adjustment menu. In particular, the volume adjustment menu may include a volume adjustment item for adjusting a volume of each item individually. The terminal 100 can adjust a volume of an item currently unselected to output a voice. If an item-a is selected to be outputted in a voice in response to a user's selection, the terminal 100 can output a voice at a volume set for the item-a.

Figure 10:
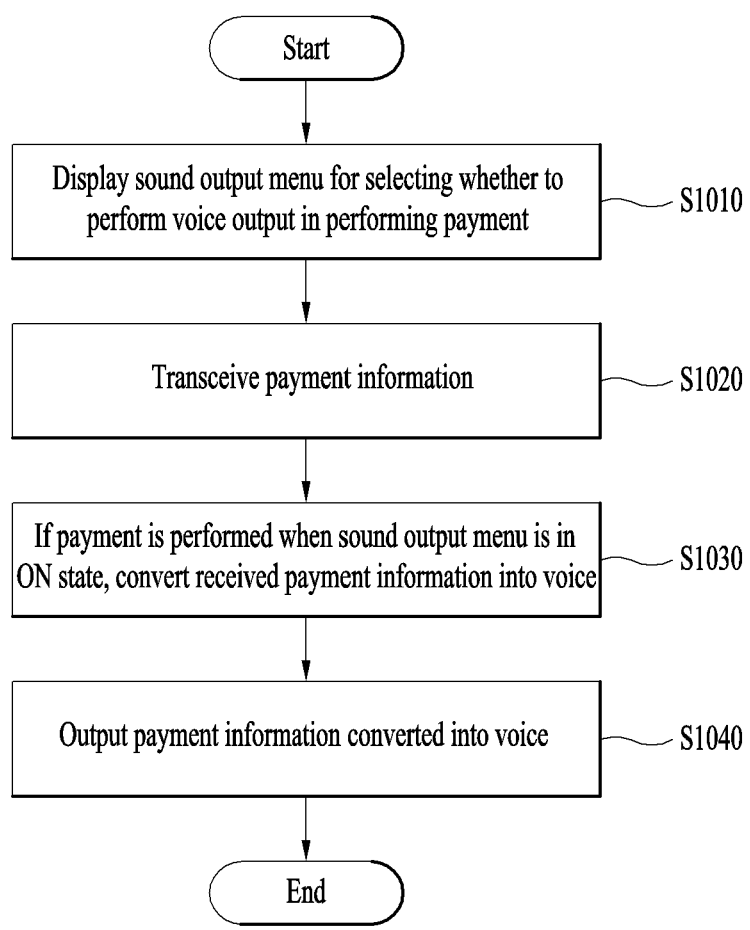
FIG. 10 is a flowchart for a method of controlling a terminal according to one embodiment of the present invention.

FIG. 10 is a flowchart for a method of controlling a terminal according to one embodiment of the present invention.

Referring to FIG. 10, a terminal can display a sound output menu for selecting whether to output a voice in performing a payment [S1010]. In this case, the sound output menu may be set to ON or OFF. In case that the sound output menu is set to ON, the terminal can output a payment item information in a voice.

The terminal can transceive payment information [S1020]. If the terminal approaches a payment terminal, a payment can be performed. The terminal can send information for the payment to the payment terminal. The terminal may receive a payment breakdown information from the payment terminal or a server.

When the sound output menu is in ON state, if the payment is performed, the terminal can convert the received payment information into a voice [S1030]. The terminal can determine an item, which is to be outputted in a voice, in the payment information. And, the terminal is able to convert information on a voice output item into a voice. Finally, the terminal can output the payment information converted into the voice [S1040].

The above-described methods can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal, comprising:
    a display unit that displays a sound output menu for selecting whether to enable a voice output when a payment is made;
    a communication unit that transmits and receives payment breakdown information;
    a controller that converts the payment breakdown information into voice data when the payment is made and a sound output option of the sound output menu is in an ON state; and
    an audio output module that outputs the payment breakdown information, converted into the voice data, as a voice output,
    wherein the controller is further configured to:
        control the display unit to display a voice output selection menu for selecting at least one type of payment breakdown information that is to be output as a voice output and convert only the selected type of payment breakdown information into voice data,
        control the display unit, when a payment mode is entered, to display a card for the payment together with a voice output information window that includes only the selected type of payment breakdown information that is to be output as a voice output,
        control the audio output module to output the voice data corresponding to the selected type of payment breakdown information after displaying the voice output information window,
        control the display unit, in response to receiving a first command of a user for extending the voice output information window, to display the voice output selection menu for selecting at least one type of payment breakdown information that is to be output as a voice output and an option item, and
        control the display unit, in response to receiving a second command of the user for selecting the option item, to display a volume adjustment menu for selecting independent volumes for each type of payment breakdown information.

2. The terminal of claim 1, wherein the payment breakdown information comprises at least one selected from the group consisting of information related to a card used for the payment, a payment time, a payment amount, a payment location, and the type of business at which the payment is made.

3. The terminal of claim 1, wherein if a payment is made, the controller controls the audio output unit to output information related to a card for the payment as a voice output.

4. A method of controlling a terminal comprising:
    displaying a sound output menu for selecting whether to enable a voice output when a payment is made;
    transmitting and receiving payment breakdown information;
    converting the payment breakdown information into voice data when the payment is made and a sound output option of the sound output menu is in an ON state; and
    outputting the payment breakdown information, converted into the voice data, as a voice output,
    displaying a voice output selection menu for selecting at least one type of payment breakdown information that is to be output as a voice output and converting only the selected type of payment breakdown information into voice data,
    displaying, when a payment mode is entered, a card for the payment together with a voice output information window that includes only the selected type of payment breakdown information that is to be output as a voice output,
    controlling the audio output module to output the voice data corresponding to the selected type of payment breakdown information after displaying the voice output information window,
    displaying, in response to receiving a first command of a user for extending the voice output information window, the voice output selection menu for selecting at least one type of payment breakdown information that is to be output as a voice output and an option item, and
    displaying, in response to receiving a second command of the user for selecting the option item, a volume adjustment menu for selecting independent volumes for each type of payment breakdown information.

5. The method of claim 4, wherein the payment breakdown information comprises at least one selected from the group consisting of information related to a card used for the payment,
    a payment time, a payment amount, a payment location, and the type of business at which the payment is made.

6. The method of claim 4 further comprising:
    outputting, if a payment is made, information related to a card used for the payment as a voice output.

* * * * *